United States Patent
Klein et al.

(10) Patent No.: US 6,247,602 B1
(45) Date of Patent: Jun. 19, 2001

(54) SOCKET FOR A STORAGE RACK

(75) Inventors: Richard B. Klein, Overland Park; Chris Serslev, Leawood; John W. Scott, Lenexa, all of KS (US)

(73) Assignee: Lynk, Inc., Lenexa, KS (US)

( * ) Notice: Subject to any disclaimer, the term of this patent is extended or adjusted under 35 U.S.C. 154(b) by 0 days.

(21) Appl. No.: 09/309,109

(22) Filed: May 10, 1999

(51) Int. Cl.$^7$ ............................................... A47B 43/00
(52) U.S. Cl. ................................................................. 211/189
(58) Field of Search ............................... 211/189, 37, 34

(56) References Cited

U.S. PATENT DOCUMENTS

| | | | |
|---|---|---|---|
| 4,356,923 | * 11/1982 | Young et al. | |
| 5,035,332 | * 7/1991 | Stravitz | 211/189 |
| 5,172,816 | * 12/1992 | Kline et al. | 211/37 |
| 5,617,959 | * 4/1997 | Klein et al. | 211/37 |
| 5,695,073 | 12/1997 | Klein et al. | 211/35 |
| 5,992,647 | * 11/1999 | Malik | 211/34 |

* cited by examiner

Primary Examiner—Alvin Chin-Shue
Assistant Examiner—Sarah Purol
(74) Attorney, Agent, or Firm—Shook, Hardy & Bacon LLP

(57) ABSTRACT

A socket for use with a rack for retaining shoes. Sockets are formed on side frame members of the shoe rack. Shoes are stored on the retaining bars fixed between opposing side frame members at the sockets. Each socket has an outer socket portion, an inner socket portion, base cavity, and a rib member extending upwardly from the base cavity. The bars are placed in the outer diameter and into alignment with the socket. Then the bars are forced into frictional engagement with the inner socket portion. The rods are supported at their ends by the upper ledge of the cavity and the rib member extending upwardly from the bottom of the cavity.

17 Claims, 1 Drawing Sheet

SOCKET FOR A STORAGE RACK

BACKGROUND OF THE INVENTION

1. Field of the Invention

The present invention is directed to an improved plastic socket for receiving a rod member. More particularly, the present invention is directed to an improved plastic socket of a type utilized on a hanging support rack, such as a shoe rack, towel rack, or the like.

2. Description of the Related Art

It is well known to utilize a socket in conjunction with a plastic storage rack for receiving rod members utilized with the racks. For example, U.S. Pat. No. 5,695,073, directed to a "Hanging Shoe Rack", illustrates and describes a shoe rack having two side frame members, with a plurality of rods extending between the side frame members, for supporting shoes. Each rod is inserted into a corresponding socket in its associated side frame member. As specifically illustrated in U.S. Pat. No. 5,695,073, the socket is constructed so as to have a first, outer portion of the socket having a larger diameter than a second, inner portion of the socket. Such an arrangement permits the rods to be initially inserted into the sockets in a loose manner during assembly of the shoe rack, and then subsequently forced into the inner portion of the socket, where the rod fits snugly. This prior art U.S. Pat. No. 5,695,073 entitled "Hanging Shoe Rack", and issued Dec. 9, 1997, is incorporated herein by reference.

While the socket illustrated and described in U.S. Pat. No. 5,695,073 is found to be highly useful, particularly due to its dual-dimension structure, it has been found to have a number of drawbacks. In this regard, it has been found that, during assembly of the shoe rack with which the socket is utilized, when the side frame members are placed on a soft surface, such as a plush carpet or bed, and the rods are forced downwardly into the sockets, it may be possible to thrust the rod through the bottom portion of the socket, thus rendering the socket unuseful. While such an occurrence is highly unlikely and does require excessive force, it has been found that such an undesirable occurrence can take place when, particularly as stated, the shoe rack is assembled on a soft surface, such that the socket does not have sufficient support for receiving a rod member thrust therein.

Additionally, the socket as illustrated and taught in U.S. Pat. No. 5,695,073, and other more conventional sockets not having the dual-dimension design, utilize far more plastic material than is necessary, particularly in the base of the socket. Additionally, when molding a plastic socket member of the conventional type, or of the type illustrated in U.S. Pat. No. 5,695,073, it often happens that peripheral areas on the outside of the socket experience sink marks when the plastic cools following molding. Such sink marks are aesthetically unpleasing, and thus undesirable.

Accordingly, the need exists for a new plastic socket which has greater structural integrity than prior plastic sockets. Additionally, the need exists for a new plastic socket which utilizes less plastic material, and is thus less expensive to manufacture, and which substantially reduces or altogether prevents undesirable sink marks from appearing on the exterior of the socket following the molding process in which the socket is formed. The present invention fills these and other needs while overcoming the drawbacks and limitations associated with the prior art.

SUMMARY OF THE INVENTION

It is an object of the present invention to utilize less material in the construction of a plastic socket member than was utilized in prior plastic sockets.

It is an additional object of the present invention to increase the structural integrity of a plastic socket member.

It is an additional object of the present invention to provide a plastic socket which is aesthetically pleasing and, particularly, which eliminates undesirable sink marks on the exterior of the socket.

These and other objects are achieved by a unique socket integrally formed of molded plastic. The socket can be utilized in combination with a wide variety of products, and is particularly useful for utilization in combination with racks of all kinds, such as shoe racks, towel racks, and the like. As will be appreciated, such products typically utilize first and second side frame members, with a plurality of support bars positioned between the respective side frame members. The support bars are supported in corresponding sockets on each of the side frame members.

The socket of the present invention is very similar in construction to the socket disclosed in U.S. Pat. No. 5,695,073 with several notable exceptions. In particular, the plastic socket of the present invention is adapted to snugly and frictionally receive a support rod. Unlike the socket of U.S. Pat. No. 5,695,073, however, the socket of the present invention utilizes a cavity at the base of the socket which is smaller in dimension than the portion of the socket which snugly and frictionally receives the rod member. This small cavity is defined by an annular wall which forms an upper ledge. The upper ledge serves as the bottom of that portion of the plastic socket which snugly and frictionally receives the rod member. The rod member, when inserted into the socket, thereby rests on the upper ledge formed by the annular wall of the cavity in the base of the socket.

In accordance with an additional aspect of the invention, a rib member is integrally molded in the cavity of the socket at a central location of the socket, and extends across the socket from one side thereof to the other. The rib member preferably extends outwardly from the bottom of the cavity to a height similar to the height of the ledge formed at the top of the annular walls of the cavity. When the rod member is inserted into the cavity, the rod member also rests on the upper surface of the rib member extending across the socket.

The unique socket design of the present invention, having a cavity formed in the base of the socket, with ledges and a reinforcement rib, provides a plastic socket member which is highly durable, and which utilizes less plastic material than conventional prior art sockets. In particular, the provision of a cavity in the base of the socket permits the socket to be made with far less material than in prior art sockets. Since less material is utilized, there is not only less material costs, but the molding process for the socket is much shorter in time duration, since there is less plastic to cycle. Therefore, the molding process associated with the manufacture of the socket of the present invention is less expensive than the molding process associated with prior art socket constructions.

Additionally, due to the decreased utilization of plastic, there is less distortion of the plastic when it cools. Thus, it has been found that the construction of the present invention prevents sink marks from forming on the exterior of the socket, as is common with prior art plastic sockets which utilize far more plastic material. Additionally, and importantly, the utilization of an annular ledge surrounding the cavity formed in the base of the socket, and the reinforcement rib member extending across the socket, makes the base of the socket much stronger than conventional prior art sockets, therefore making it much more difficult for an individual assembling a shoe rack incorporating the socket of the present invention to punch through the base of the socket.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
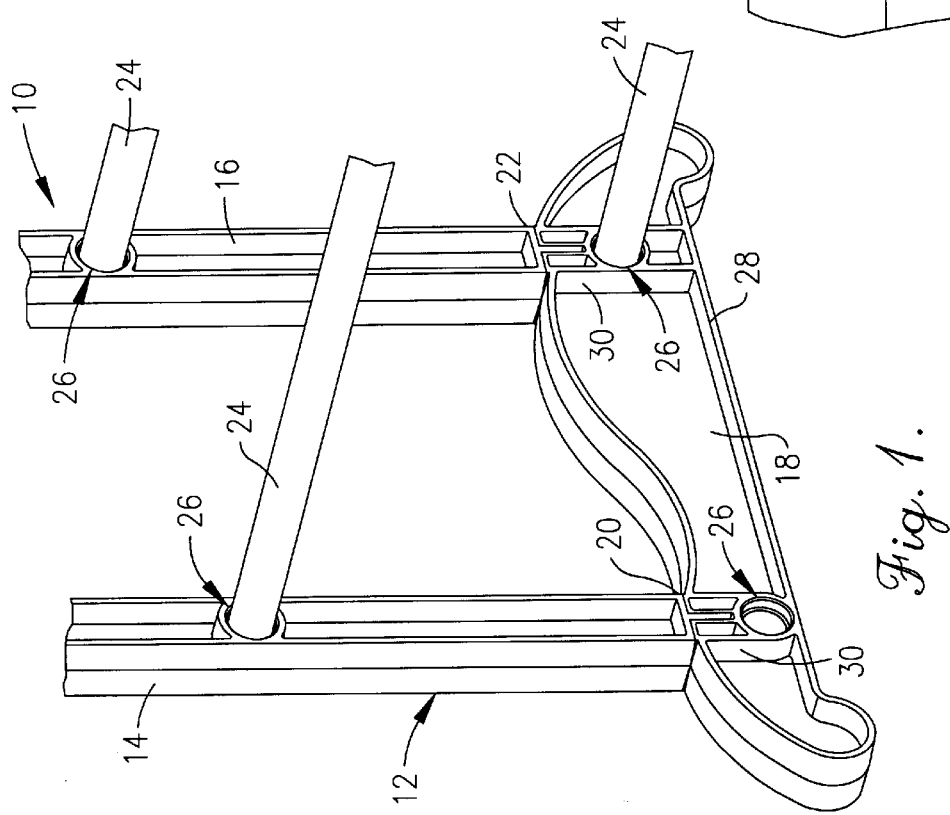
FIG. 1 is a right, frontal perspective view of a socket assembly according to the present invention.

With reference initially to FIG. 1, the modular shoe rack of the present invention is denoted generally by reference numeral 10. Shoe rack 10 has a first side frame member 12. Side frame member 12 includes a pair of elongate body sections 14, 16 rigidly secured to one another by a base support 18 at first ends 20, 22. Body sections 14, 16 extend in parallel alignment to one another and are rigidly secured to one another at second ends (not shown) by an opposing support section (not shown) similar to base support 18. A plurality of cylindrical retaining rods 24 are fixedly retained between the opposing side frame members 12. Sockets 26 on the body sections 14, 16 securely retain opposite outer ends of the retaining rods 24. The body sections 14, 16 are preferably constructed in the form of an I-beam and the irregularly shaped base support 18 includes a flange 28 about its perimeter having a width generally equal to the I-beam flanges of body sections 14, 16. Also, a pair of sockets 26 are supported by vertically disposed ladder supports 30 extending generally from the top to the bottom of the base support 18. The ladder supports 20 extend axially in alignment from the ends 20, 22 of body sections 14, 16.

FIG. 1 demonstrates the lower portion of one side of a shoe rack 10. As disclosed fully in U.S. Pat. No. 5,695,073, herein incorporated by reference, modular shoe rack 10 may comprise opposing side frame members having an equal number of sockets for receipt of the opposite ends of the retaining rods. In U.S. Pat. No. 5,965,073, the retaining rods are positioned in pairs between opposing side frame members having a single elongate body with a plurality of support arms extending therefrom. The shoe rack 10 of FIG. 1 differs only in that two elongate side members 14, 16 retain pairs of retaining rods 24. Importantly, the sockets 26 of the present invention are suitable and advantageous in the shoe rack of the prior art patent as well as numerous other devices such as racks for retaining towels or athletic equipment.

The sockets of the first side member 12 and the second side member (not shown) are spaced at corresponding positions along their main body sections so that the rods 24 are parallel with one another when secured to the opposing side frame members. The rods 24 are oriented in pairs on main body sections 14, 16 and the lower base support 18. Generally, within each pair of corresponding rods 24, the rod 24 secured to main body section 16 is disposed at a location vertically higher than the rod 24 secured to main body section 14. As more fully explained in U.S. Pat. No. 5,695,073, the pairs of rods 24 are aligned in a plane forming an acute angle with respect to vertical when the rack is secured to a vertical surface. Similarly, the pair of rods 24 positioned within base support 18 are similarly aligned. Thereby, the rods 24 support shoes or other articles in an inclined manner.

Figure 2:
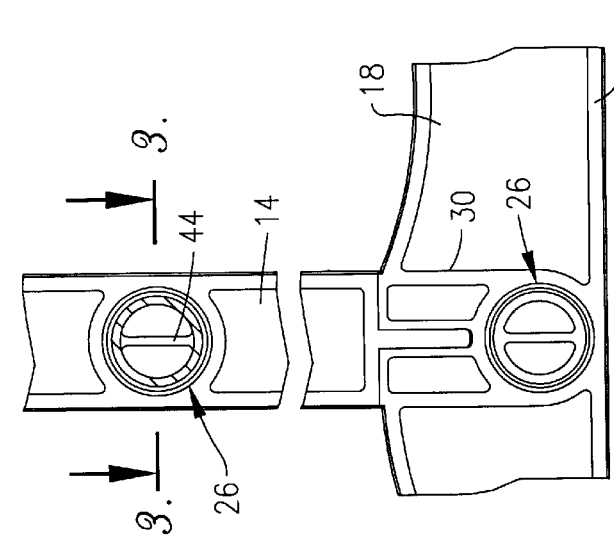
FIG. 2 is a side elevational fragmentary view illustrating the interior of the socket of the present invention.
Figure 3:
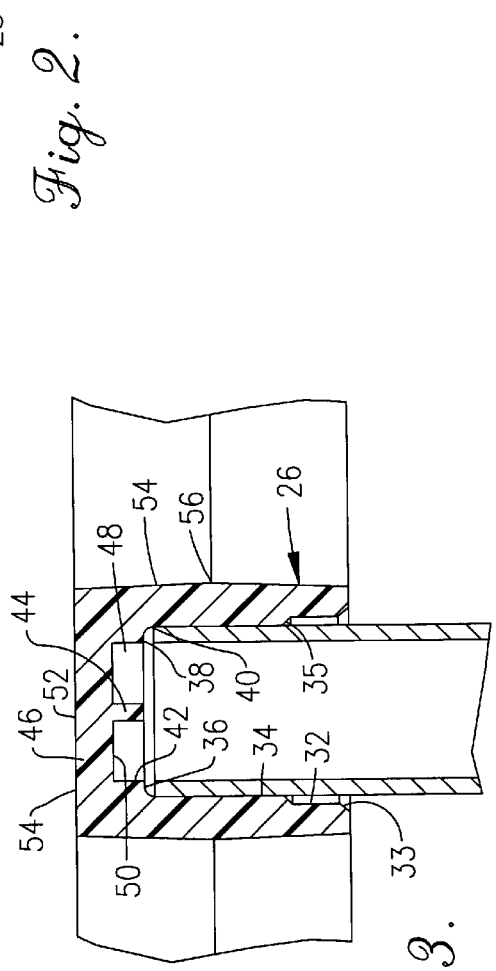
FIG. 3 is a cross-sectional view taken along line 3—3 of FIG. 2.

As illustrated in FIG. 2, in the preferred embodiment, the sockets 26 on body sections 14, 16 are centrally located within the body sections 14, 16. Also, the rods 24 mounted on the lower base support are centrally positioned within the ladder supports 30 extending linearly from the main body sections 14, 16. As best shown in FIG. 3, a cross sectional view taken along line 3—3 of FIG. 2, the socket 26 of the present invention is illustrated. Socket 26 includes an annular outer socket portion 32 and an annular inner socket portion 34. Inner socket portion 34 has a slightly smaller diameter than outer socket portion 32. A chamfered region 33 is formed at the outermost portion of outer socket portion 32. A second chamfered region 34 is located between outer socket portion 32 and inner socket portion 34. As more fully discussed below, these chamfered regions guide the rods 24 into the outer and inner portions of sockets 26 during assembly of the shoe rack 10.

Preferably, at the base of inner socket portion 34, an upper ledge 36 is defined. Upper ledge 36 extends radially inward from inner socket portion 34. The inner edge 38 of upper ledge 36 has a diameter which is slightly smaller than the diameter of inner socket portion 34. A fillet 40 is formed at the intersection of inner socket portion 34 and ledge 36.

A cylindrical cavity sidewall 42 extends downwardly from the inner diameter 38 of ledge 36 and terminates at a solid base 46. A rib member 44 extends upwardly from solid base 46 of socket 26 to define a cavity 48 between either side of the rib member 44 and the cavity sidewall 42. The rib member 44 is preferably positioned diametrically with respect to the inner edge 38 of upper ledge 36 and extends from one side of the socket 26 to the other. More preferably, as shown in FIGS. 2 & 3, the rib member 44 is positioned generally parallel to the elongate axis of one of the main body sections 14, 16. The rib member 44 extends outwardly from the bottom 50 of cavity 48 to a height similar to the height of upper ledge 36. Preferably, the rib member 44 has a rectangular cross section and is integrally molded with the outer components of the socket 26. However, the rib member 44 may be formed from a variety of different cross section shapes so long as the space between the cavity sidewall 42 and the rib member 44 is sufficient to produce the advantageous results of the present invention as explained more fully below.

The solid base 46 forming the bottom 50 of cavity 48 extends away from the cavity 48 and terminates at a base end 54 substantially coplanar with the rear edge of the I-beam flanges of body sections 14, 16 or the flange 28 of ladder supports 30. An outer sidewall 54 is formed along the exterior of socket 26. The side wall 54 converges with the I-beams of body sections 14,16 as shown in FIGS. 1 and 3. The sidewall 54 slopes slightly outwardly from either end of the socket 18, and the sloping portions of sidewall 54 and meet at an apex 56. The apex 56 is near the midpoint of the sidewall 54 in the preferred embodiment.

The cavity 48 of the present invention reduces the amount of material necessary to produce the side frame members 12 of shoe rack 10. Also, the presence of cavity 48 between the rib member 44 and the cavity sidewall 42 leads to a significant reduction of sinking of plastic socket 26 during the cooling portion of the molding process. Since less sinking occurs during the manufacturing process, the structural integrity of the sockets of the present invention is significantly improved and the unsightly lines formed on the outer sidewalls of prior art sockets are eliminated. Further, since the side frame members 12 contain less plastic material, the time required for injection and cooling during the production process are both significantly reduced.

The side frame members 12 are preferably molded from a plastic such as a thermal plastic compound, but may be formed from other materials. Most preferably, the plastic sockets 26 are integrally molded with the side frame members 12. The rods 24 are preferably formed of a lightweight sturdy material such as aluminum or steel.

In the most preferred embodiment, the cylindrical rods 24 have a diameter of approximately 0.5 inches. The width outer sidewall 54 at the opening end of the socket is between 0.084 inches to 0.1 inches. The diameter of outer socket portion 32 is relatively constant and is approximately 0.55 inches, and the depth of the outer socket portion 32 is about 0.17 inches. Preferably, inner socket portion extends about 0.48 inches from the bottom of chamfered region 35 to upper ledge 36. The inner socket tapers slightly (about 0.5°) from a diameter of about 0.503 inches at the intersection of inner socket portion 34 and chamfered region 35 to about 0.495 inches at the depth at which upper ledge 36 is formed. The inner edge 38 of upper ledge 36 preferably extends inwardly to a diameter of about 0.405 inches. Cylindrical cavity sidewall 42 extends downwardly about 0.09 inches from upper ledge 36. The rib member 44 extends upwardly to a height equal to the height of upper ledge 36 and has a rectangular cross section of about 0.066 inches. The base 46 of socket 26 in the preferred embodiment has a depth of approximately 0.11 inches. Fillets may be formed at the intersections of bottom 50 and both cavity sidewall 42 and rib member 44. Of course, these dimensions are merely representative and may be varied without departing from the inventive aspects of the present invention.

During assembly, a side frame member 12 may be laid on a flat surface and the various retaining rods 24 loosely positioned within the outer socket portion 32 of corresponding receiving sockets 26. Side frame member 12 may then be positioned downwardly onto the retaining bars, wherein the retaining bars are loosely positioned within the outer socket portion 32 of sockets 26. The chamfered region 33 directs each rod 24 into the outer socket portion 32 during this stage of assembly.

It will be appreciated that, with the retaining rods 24 only loosely positioned within the outer socket portion 32, the bars are less rigid than when snugly secured within the inner socket portion 34 having the smaller diameter. As such, the rods 24 may be manipulated to align with the receiving sockets 26 on the opposing side frame members (not shown), so that the rods 24 may be placed within the large diameter portion 32 of corresponding receiving sockets 26. Next, the side frame members may be depressed together, thus forcing the rods 24 into the inner socket portions 34 of the receiving sockets 26, thereby rigidly attaching the retaining rods 24 to the side frame members 12. The second chamfered region 35 helps direct the rods 24 into the inner socket portion 34 without creating an axial load at the inner socket portion 34 on the sidewall of socket 26. The receiving socket 26 of the present invention, so in having the first and second peripheral dimensions of different sizes, facilitates insertion and alignment of retaining rods 24 and the overall easy assembly of hanging shoe rack 10.

When the retaining rods 24 are depressed into the inner socket portion 34, the end of each rod 24 is supported along its periphery by upper ledge 36 and by rib member 44 along a diameter of the circular end of the rod 24. The structural support provided by socket 26 to each corresponding rod 24 prevents the rod 24 from piercing through the base 46 as in prior art sockets. Particularly, when the side frame member 12 is placed on soft surface such as carpet during assembly of the shoe rack 10, the solid base sections does not allow this type of failure as in prior art sockets having continuous solid base structures.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A socket, for receiving a rod, said socket comprising:
   an outer structure defining an inner socket portion, said outer structure including a bottom portion defining a closed bottom of the socket, said bottom portion having a cavity formed therein, said cavity defined by a peripheral side wall which forms an upper ledge, wherein said rod rests on said upper ledge when said rod is inserted in said inner socket portion.

2. A socket as set forth in claim 1, wherein said socket further comprises a rib member located in said cavity.

3. A socket as set forth in claim 2, wherein said rib member extends across said cavity from a side thereof to another side thereof.

4. The socket as set forth in claim 3, wherein said rib member extends outwardly from a bottom of said cavity so as to extend substantially to the level of said upper ledge.

5. The socket as set forth in claim 4, wherein said socket is formed of plastic.

6. The socket as set forth in claim 5, wherein said socket is integrally combined with a plastic side frame member of a support rack.

7. The socket as set forth in claim 1, said socket further comprising an inner portion having a first peripheral dimension adjacent the bottom of said socket, and an outer portion having a second peripheral dimension adjacent an open end of said socket, wherein said second peripheral dimension is greater than said first peripheral dimension, wherein an outer end of said rod member is loosely received within said outer portion, and is snugly received in said inner portion.

8. A support rack comprising:
   first and second side members, each said side member having a socket thereon; and
   a rod, having first and second outer ends, wherein each outer end of said rod is received in a corresponding one of said sockets, where each said socket has an outer structure defining an inner socket portion, said outer structure including a bottom portion defining a closed bottom of said socket, said bottom portion having a cavity formed therein, said cavity defined by a peripheral side wall which forms an upper ledge, wherein said rod rests on said upper ledge when inserted therein.

9. A support rack as set forth in claim 8, wherein said socket further comprises a rib member located in said cavity.

10. A support rack as set forth in claim 9, wherein said rib member extends across said cavity from a side thereof to another side thereof.

11. The support rack as set forth in claim 10, wherein said rib member extends outwardly from a bottom of said cavity so as to extend substantially to the level of said upper ledge.

12. The support rack as set forth in claim 11, wherein said socket is formed of plastic.

13. The support rack as set forth in claim 12, wherein said socket is integrally combined with one of said plastic side members of the support rack.

14. The support rack as set forth in claim 8, said socket further comprising an inner portion having a first peripheral dimension adjacent the bottom of said socket, and an outer portion having a second peripheral dimension adjacent an open end of said socket, wherein said second peripheral dimension is greater than said first peripheral dimension, wherein an outer end of said rod member is loosely received within said outer portion, and is snugly received in said inner portion.

15. The support rack as set forth in claim 8, wherein said first and second side members each have a plurality of said sockets, and wherein a plurality of rods extend between said side frame members and are inserted in corresponding ones of said sockets.

16. A socket, for receiving a rod, said socket comprising:

an outer structure defining an inner socket portion, said outer structure including a bottom portion defining a bottom of the socket, said bottom portion having a cavity formed therein, said cavity defined by a peripheral side wall which forms an upper ledge, wherein said rod rests on said upper ledge when said rod is inserted in said inner socket portion; and a rib member located in said cavity, wherein said rib member extends across said cavity from a side thereof to another side thereof.

17. A support rack comprising:

first and second side members, each said side member having a socket thereon; and a rod, having first and second outer ends, wherein each outer end of said rod is received in a corresponding one of said sockets, wherein each said socket has an outer structure and a rib member, wherein said outer structure defines an inner socket portion and includes a bottom portion defining the bottom of the inner socket portion, said bottom portion having a cavity formed therein, said cavity defined by a peripheral side wall which forms an upper ledge, wherein said rod rests on said upper ledge when inserted therein, and wherein said rib member is located in said cavity, said rib member extending across said cavity from a side thereof to another side thereof.

* * * * *